3,497,468
BENZONITRILE/N-METHYL PYRROLIDONE SOLVENT SYSTEM FOR POLYAMIDE-IMIDE
William W. Ulmer, Muskegon, Mich., assignor to Anaconda Wire and Cable Company, New York, N.Y., a corporation of Delaware
No Drawing. Filed Jan. 4, 1967, Ser. No. 607,164
Int. Cl. C08g 51/44, 41/00
U.S. Cl. 260—30.2                          3 Claims

ABSTRACT OF THE DISCLOSURE

The addition of benzonitrile to a magnet wire coating composition in an amount equivalent to 10%–90% by weight of the solvent system substantially improves its physical characteristics particularly the solvency action and the laminar flow of the composition.

BACKGROUND OF THE INVENTION

(I) Field of invention

This invention relates to magnet wire coating composition and the resultant coated magnet wire. More particularly, it relates to the use of benzonitrile in a magnet coating composition to improve the coating characteristic thereof.

(II) Description of the prior art

A number of polymers have been used as insulation of electrical conductors for the manufacturing of magnet wires. The polymers used include polyamides, polyesters, formals of polyvinyl alcohol, epoxy resins, and the more recently developed amide-imide polymers. These polymers are used primarily in the form of an enamel or a dipping varnish and are applied to a thin electrical conductor by a multiple coating operation to produce magnet wires with proper insulation vlaues. The success of the coating operation depends to a large extent on the coating characteristics of the composition and which, in turn, depends on the solvent system used.

Although each of the solvent systems used in the commercial production of magnet wires has different desirable characteristics, they all appear to have insufficient solvency action for the polymers. Greater solvency action will allow the coating composition to have a higher content of polymeric solids without affecting the coating characteristics of the composition. Coating composition with higher content of polymeric solids will provide higher build-up for each coating, thus reducing the number of coatings required to provide the necessary insulation for the magnet wires. Increasing solvency action of a solvent system will also allow better applications of certain high molecular weight polymers such as nylon and terephthalate polyesters of the Dacron type as an overcoat of magnet wires.

SUMMARY OF THE INVENTION

The present invention is based on the discovery that benzonitrile when added to the prior art magnet coating composition substantially improves its physical characteristics particularly its solvency action and its laminar flow characteristics. The use of benzonitrile in the amount ranging from 10% to 90% by weight based on the solvent system will permit the use of higher polymer content without increasing the viscosities. Broadly stated, the magnet wire coating composition of this invention comprises a polymer selected from the group consisting of polyamides, polyesters, formals of polyvinyl alcohols, epoxy resins, and amide-imide polymers, in a solvent system for said composition and benzonitrile in an amount equivalent to 10–90% by weight of the solvent system. The composition contains 5% to 35% by weight of polymer solids.

DESCRIPTION OF THE PREFERRED EMBODIMENTS

Advantageously, the coating composition of this invention is prepared by the addition of benzonitrile into an existing commercial magnet wire coating composition containing the polymer of the type referred to hereinabove. The amount of benzonitrile that may be used for the preparation of the present coating composition varies depending on the polymer and the solvent system used and the type of coating operation for which the composition is intended. Generally, the amount falls within the range of 10%–90% by weight of the solvent system. This range, however, is not critical. An amount lower than the preferred range may still provide beneficial results to the coating composition. An amount greater than 90%, on the other hand, will not render the composition inoperative. The excess amount generally will not provide any additional benefits.

The suitable polymers, as stated hereinabove are: polyamides, polyesters, formals of polyvinyl alcohol, epoxy resins, and amide-imide polymers. Magnet wire coated by these polymers are well known and available commercially.

Preferred polyamides, for example, are Rilsan, Nylon 6,6, Nylon 6 and Versamid which are manufactured by the polymerization of 11-amino undecanoic acid, hexamethylene-diamine-adipic acid, caprolactam and dimerized vegetable oil acids, respectively. Copolymers as well as mixed polymers of polyamides may also be used.

In preparing a polyamide magnet wire coating composition, the polymer is dissolved in a solvent system and generally with additives to form an enamel, contains about 5–25% by weight of polymer solids. The solvent systems may be a single solvent or a mixture of solvents or it may be a solvent admixed with a diluent of lower cost. A preferred solvent system is a mixture of cresylic acid and phenols. I have found that the addition of benzonitrile to a polyamide enamel, particularly the high molecular weight type of nylon enamel using cresylic acid and phenols mixture as the solvent system will greatly improve its solvency action.

A number of polyesters can be used for the preparation of magnet wire coating composition of this invention. The preferred polyesters include terephthalate polyester resins and terephthalate polyester-cyanurate resins. Examples of polyester or modified polyester solutions for magnet wire coating are disclosed in Patent Nos. 2,889,304, and 2,936,296. Other cross-linked polyesters that may be used include the dihydric alcohol polyester cross-linked with epoxy resin and hydric-polyhydric alcohol mixture polyesters, the preparation of which is disclosed in Patent No. 3,240,626.

Among the commercially available enamels prepared from formals of polyvinyl alcohol, I found Formvar enamels to be particularly desirable. The polymer may be a mixture of (a) polyvinyl acetal resin (condensation product of an aldehyde with a product of hydrolysis of a polyvinyl ester) or a phenol-aldehyde modified polyvinyl acetal resin and (b) melamine or a melamine condensation reaction product. Suitable solvents for these polymers include cresol and naphtha. Typical magnet wire coating compositions of this type are disclosed in Patent Nos. 2,730,466 and 2,836,518.

The suitable epoxy enamels are diglycidyl ethers of bis-phenol A and its homologues, glycidyl ethers of bis-phenol F, glycidyl ethers of tetrakis (hydroxyphenyl) ethane and epoxylated Novolacs. Other types of modified epoxy resins particularly the flexible epoxy resins may also be used either alone or in combination with one or more of the aforenamed epoxy resins. The flexible epoxy resins are available commercially. Generally, they are long chain diepoxies, in some instances triepoxies, containing long aliphatic chains which provide the flexibility of these resins.

The solvent system for the epoxy resins depends on the epoxies. For uncured epoxy resins, oxygenated solvents, such as ketones, esters, and ethers and highly halogenated hydrocarbons may be used. Aromatic solvents, such as toluene and xylene, as well as simple alcohols are not active solvents for the epoxies; however, in combination, they develop latent solvency for the resins. The mixed solvents included for examples are toluene-acetone, toluene-cellosolve acetate, and toluene isoporone.

The amide-imide polymers that are suitable include the polymers containing both amide and imide linkage in a repeating unit of

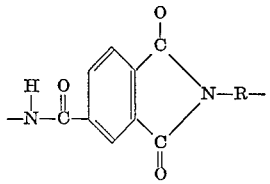

wherein R is a residue of an organic diamine.

The polyamide-imide may be prepared by copolymerization of an acyl halide derivative of trimellitic anhydride (1,2,4-benzene tri-carboxylic acid anhydride) and an aromatic primary diamine. The polymeric products may have the following structure:

(A)

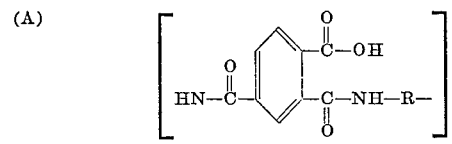

and (B)

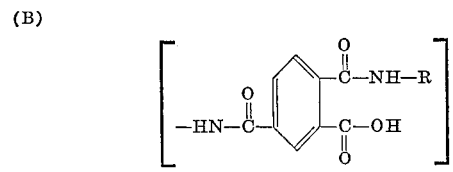

wherein R is the aromatic nucleus of the starting diamine, $H_2NRNH_2$. The linking groups are probably predominantly amido although some may be imido. The polymeric structure may also contain free carboxyl groups which are capable of further reaction. When the enamel is further reacted, for example, in the manufacture of the magnet wire the above stated reaction products (A) and (B) are to form polymer conforming to the structure of

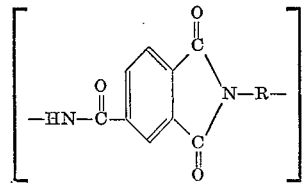

The free carboxyl groups initially present in the polymeric structures are to a substantial extent converted to imide groups by condensation with available amide groups.

The acyl halide derivatives of trimellitic anhydride that are suitable for preparing the aforementioned polyamide-imide polymer have at least one acyl halide group in the 4-ring position. They include, for example, 4-acid chloride, 1,4 and 2,4-diacid chloride (with an ester in the remaining position) and 1,2,4-triacid chloride. The bromides and other reactive halide derivatives are also suitable.

The aromatic diamine that may be used for preparing polyimide enamel preferably have one or more aromatic rings and two primary amino groups. The aromatic diamines having more than one aromatic ring may be polycyclic aromatic compounds having amino groups on an interconnected polycyclic aromatic nucleus.

Specific examples on how the polyamide-imide polymers are prepared are described in greater detail in Netherland Patent No. 6,400,422.

Suitable solvents for amide-imide polymers include N-methyl pyrrolidone and cellosolve acetate and their mixtures. Diluents such as WES oil may be used to reduce the cost of the solvent system. Additives such as acetanilide are commonly used to improve the flow characteristics of the amide-imide enamels. I have found using benzonitrile, this type of additive, particularly acetanilide may be eliminated from the solvent solution without adversely affecting the flow characteristics thereof. The elimination of acetanilide in the solvent system has the added advantage of improving solvent recovery efficiency. Acetanilide has a tendency to crystallize in the solvent recovery system which sometimes plugs up the conduits.

Further to illustrate this invention, specific examples are described hereinbelow.

EXAMPLE I

A polyamide-imide prepared by reacting trimellitic anhydride and p,p′-methylene-bis(aniline) was dissolved in a solvent system containing 2.5 to 1 ratio of benzonitrile to N-methyl pyrrolidone to produce an enamel of 28% solids with a viscosity of 30 poises at 25° C. The amide-imide polymer was dissolved in 30 minutes at 50° C. with agitation.

By comparison, an amide-imide polymer prepared in the same manner as described was dissolved in N-methyl pyrrolidone without benzonitrile. After 3 hours of agitation, the polymer dissolved in the solvent to form an enamel of 29% solids.

EXAMPLE II

This example illustrates by the following runs a higher build per coat at higher speed with lower solid content and lower viscosity may be obtained using the magnet wire coating composition of this invention. The polyamide-imide used was prepared by reacting trimetallic anhydride and p,p′-methylene bis-(aniline).

(1) To 70% by weight of an amide-imide enamel containing 3:1 ratio of N-methyl pyrrolidone to WES oil was added 15% by weight of 1,4 butanediol and 15% by weight of benzonitrile. The resulting 21.5 solids enamel had a viscosity of 21 poises at 25° C. In 6 coats on a 12-foot horizontal enameling machine at normal coating conditions #18 wire was smoothly coated to 2.3 mils build, or 0.4 mil per coat.

(2) The same amide-imide enamel in N-methyl pyrrolidone with a solids content of 28% and a viscosity of 69.5 poises at 25° C. was applied with the same dies under the same conditions to #18 wire and build of 1.9 mils resulted, or 0.3 mil per coat.

This aid to the flow through dies is important as speed increased. It also insures better concentricity and better continuity and dielectric results to mention a few improved properties.

EXAMPLE III

Excellent wires were made in five coats vertically with the dieless applicator using the following formulations:

(1)

| | Percent |
|---|---|
| A.I.–220 Lot #2027 (polyamide-imide produced by reacting trimellitic anhydride and p,p'-methylene-bis-aniline) | 20.0 |
| Dicyandiamide | 0.3 |
| Triphenyl phosphite | 0.5 |
| N-methyl pyrrolidone | 37.0 |
| WES oil (aromatic hydrocarbon fraction produced by Allied Chemical Corporation, Plastics Division, Morristown, N.J.) | 12.0 |
| Benzyl benzoate | 7.0 |
| Benzonitrile | 24.0 |

(20% solids 9–10 poises at 25° C.) (2.7 mils build in 5 coats).

(2)

| | Percent |
|---|---|
| A.I.–220 Lot #2027 | 18.5 |
| Dicyandiamide | 0.3 |
| Triphenyl phosphite | 0.5 |
| N-methyl pyrrolidone | 35.47 |
| WES oil | 10.7 |
| Benzyl benzoate | 6.2 |
| Cellosolve acetate | 7.7 |
| Benzonitrile | 21.5 |

(18.5% solids 7 poises at 25° C.) (2.5 mils build in 5 coats).

I claim:

1. In a wire coating composition containing a curable amide-imide polymer of trimellitic anhydride acyl halide derivative and an aromatic diamine and a solvent system for said polymer which includes N-methyl pyrrolidone, wherein the concentration of polymeric solids is about 5% to about 35% by weight, the improvement comprising from about 10% to about 90% of benzonitrile included in said composition based on the weight of said solvent system.

2. The improvement according to claim 1 wherein said aromatic diamine is p,p'-methylene-bis(aniline).

3. In a wire coating composition composed principally of a curable amide-imide polymer of trimellitic anhydride acyl halide derivative and an aromatic diamine and a solvent system for said polymer which includes N-methyl pyrrolidone, wherein the concentration of polymeric solids is about 5% to about 35% by weight, the improvement comprising from about 10% to about 90% of benzonitrile included in said composition based on the weight of said solvent system, said improved composition being characterized in providing relatively thicker coats of said polymer upon a wire from relatively lower viscosity solutions as compared to an equivalent composition which lacks said benzonitrile.

References Cited

UNITED STATES PATENTS

| 3,260,691 | 7/1966 | Lavin. | |
| 3,179,614 | 4/1965 | Edwards | 260—32.4 |
| 2,583,509 | 1/1952 | Hartough | 260—32.4 |
| 3,310,527 | 3/1967 | Acetis | 260—32.4 |

MORRIS LIEBMAN, Primary Examiner

P. R. MICHL, Assistant Examiner

U.S. Cl. X.R.

260—32.4